(12) United States Patent
Oberhaus et al.

(10) Patent No.: US 7,743,242 B2
(45) Date of Patent: Jun. 22, 2010

(54) METHOD AND SYSTEM FOR AUTOMATIC GENERATION OF OPERATING SYSTEM BOOT IMAGES

(75) Inventors: Jared Martin Oberhaus, Palo Alto, CA (US); Paul Allen Emhoff, Carnation, WA (US); Ye Jin, San Jose, CA (US); Joshua Alan New, Oakland, CA (US)

(73) Assignee: Scalent Systems Inc., Palo Alto, CA (US)

( * ) Notice: Subject to any disclaimer, the term of this patent is extended or adjusted under 35 U.S.C. 154(b) by 886 days.

(21) Appl. No.: 11/581,948

(22) Filed: Oct. 16, 2006

(65) Prior Publication Data

US 2008/0091929 A1  Apr. 17, 2008

(51) Int. Cl.
*G06F 15/177* (2006.01)
(52) U.S. Cl. .................. 713/2; 713/1; 713/100
(58) Field of Classification Search ................ None
See application file for complete search history.

(56) References Cited

U.S. PATENT DOCUMENTS

| | | | |
|---|---|---|---|
| 6,466,972 B1 * | 10/2002 | Paul et al. | 709/222 |
| 6,795,912 B1 * | 9/2004 | Itoh et al. | 713/2 |
| 6,931,558 B1 | 8/2005 | Jeffe et al. | |
| 6,990,573 B2 | 1/2006 | Cherian et al. | |
| 6,993,642 B2 | 1/2006 | Burkhardt et al. | |
| 7,448,034 B2 | 11/2008 | Anderson | |
| 7,565,517 B1 * | 7/2009 | Arbon | 713/1 |
| 2005/0027831 A1 | 2/2005 | Anderson | |
| 2005/0198239 A1 * | 9/2005 | Hughes | 709/222 |
| 2005/0198629 A1 * | 9/2005 | Vishwanath | 717/174 |

* cited by examiner

*Primary Examiner*—Dennis M Butler
(74) *Attorney, Agent, or Firm*—William L. Botjer

(57) ABSTRACT

A method, system and computer program product for automatically generating an operating system boot image for remotely booting a target machine is provided. The operating system boot image is installed on a first machine. The first machine and the target machine are connected with each other. Further, the hardware information of the target machine is extracted. An example of the hardware information includes Peripheral Component Interconnect (PCI) devices present on the target machine. The operating system boot image is configured, based on the hardware information.

15 Claims, 10 Drawing Sheets

METHOD AND SYSTEM FOR AUTOMATIC GENERATION OF OPERATING SYSTEM BOOT IMAGES

BACKGROUND OF THE INVENTION

The present invention relates to the field of computer networks. More specifically, the present invention describes a method and a system for generating an operating system boot image for remotely booting a machine such as a computer.

Remote booting is a process for providing support to a target machine for loading an operating system boot image stored on a remote machine. The remote machine and the target machine communicate with each other using a communication link such as a local area network (LAN). Remote booting does not require the target machine to have a local operating system boot image. The operating system boot image stores hardware information such as the device drivers required for booting the target machine into the given operating system.

Usually, machines in the network differ in their hardware configurations. Therefore, the boot image present on the remote machine may not be able to boot the given target machine.

Various methods are currently used for configuring an operating system boot image for remotely booting a given target machine in the network. One such method is maintaining multiple versions of the boot image, properly configured to the specific hardware configurations of each target machine in the network. With the increase in the size of the network, the number of machines and the boot images required to boot these machines increases. As a result, managing multiple versions of the boot image leads to increase in consumption of resources and hence a large overhead.

Another method for configuring an operating system boot image is manually configuring the boot image during the process of remote booting. The manual configuration is based on the hardware configuration of the target machine and may include installing the drivers for the devices for which the boot image is not configured. However, this method requires manual intervention to configure the boot image. This makes it labor intensive and time consuming. Further, to avoid manual intervention, some methods execute a script on the target machine with the operating system boot image, which installs the drivers that exist on the machine. However, executing the script requires boot image to be loaded on the target machine. Therefore, the success of this method depends on the proper loading of the boot image. Further, only the device drivers that are available on the target machine can be installed.

Another method for configuring the boot image is recovering the pre-installed boot image of the target machine over the network and re-installing the image on the target machine. However, the method installs a fresh boot image on the target machine and looses the pre-configured states of the boot image.

In light of the above discussion, there is a need for a method and a system that automatically configures the operating system boot image to boot on different hardware platforms. The method should eliminate the need to maintain multiple versions of the boot image for different hardware platforms. Further, if an operating system is already installed on the target machine the method can recover the pre-configured states of the operating system.

SUMMARY OF THE INVENTION

An object of the invention is to automatically generate an operating system boot image on a first machine capable of remotely booting a target machine without manual intervention.

Another object of the invention is to use an operating system boot image generated on a first machine to remotely boot a target machine without installing an operating system or software on the target machine.

To achieve the above-mentioned objectives, various embodiments of the invention provide a method and a system for the automatic generation of an operating system boot image for remote booting a target machine. The operating system boot image is installed on a first machine. The first machine and the target machine are connected in a network. A hardware-detection image stored on a remote machine is booted on the target machine to extract its hardware information. Examples of the hardware information include one or more Peripheral Component Interconnect (PCI) device instance IDs, and PCI device identifiers present on the target machine. The operating system boot image is then configured on the remote machine, based on the hardware information. For example, the operating system boot image is configured by adding new registry entries or modifying the existing registry entries with the hardware information associated with the PCI devices present on the target machine.

The present invention provides a method for automatic generation of an operating system boot image for remote booting a target machine. The method eliminates manual intervention and reduces the overhead of storing multiple boot images for different hardware configurations.

BRIEF DESCRIPTION OF THE DRAWINGS

Embodiments of the invention will hereinafter be described in conjunction with the appended drawings, provided to illustrate and not to limit the invention, wherein like designations denote like elements, and in which.

DESCRIPTION OF EMBODIMENTS

Various embodiments of the invention provide a method and a system for automatic generation of an operating system boot image. A first machine is connected in a network. The first machine includes an installed instance of an operating system boot image. A target machine is introduced in the network. Hardware information pertaining to the target machine is extracted. The hardware information is used to configure the operating system boot image. The operating system is configured to remotely boot the target machine.

Figure 1:
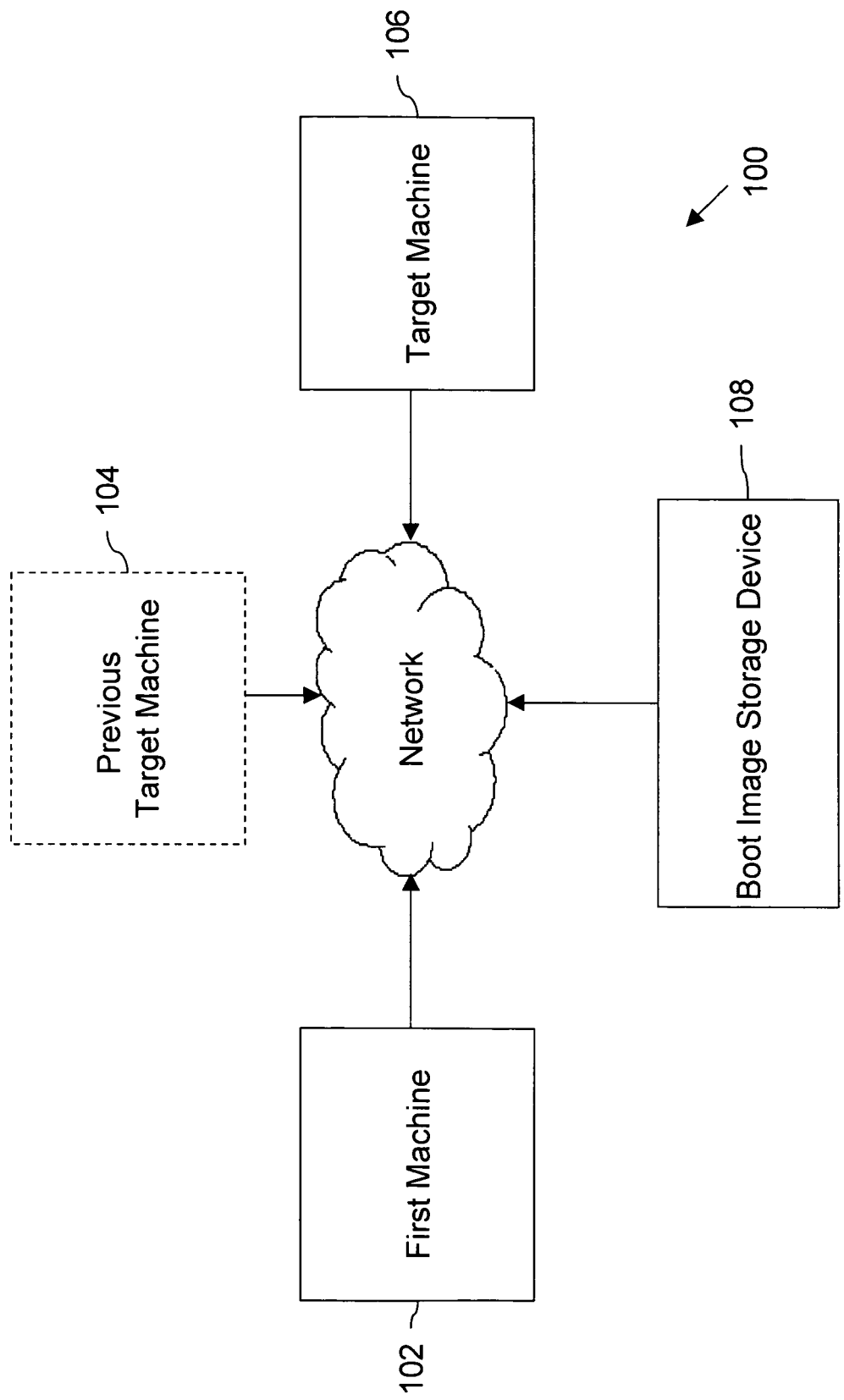
FIG. 1 illustrates a network 100, in which various embodiments of the present invention may be practiced.

FIG. 1 illustrates a network 100 in which various embodiments of the present invention may be implemented. Network 100 includes a first machine 102, a previous target machine 104, a new target machine 106, and a boot image storage device 108. New target machine 106, hereinafter referred to as target machine 106, is introduced in network 100 to replace previous target machine 104. The replacement may be performed, if, for instance, there is a technical malfunction in the previous target machine 104. Therefore, target machine 106 is booted with a configuration that is similar to that of previous target machine 104.

Boot image storage device 108 includes an operating system boot image. The operating system boot image stores the information required to boot a machine into a given operating system. For example, the operating system boot image is required for booting target machine 106 on network 100.

In various embodiments of the present invention, first machine 102, previous target machine 104 and target machine 106 have different hardware configurations. In various embodiments of the present invention, previous target machine 104 with an updated hardware configuration is referred to as target machine 106. Examples of first machine 102, previous target machine 104 and target machine 106 include a computer, a server, and the like. In an embodiment of the present invention, one or more operating system boot images are present on boot image storage device 108. In an embodiment of the present invention, one or more boot image storage devices are present on network 100. In various embodiments of the present invention, network 100 may be a wired or wireless network. Examples of network 100 include, but are not limited to, Local Area Network (LAN), Metropolitan Area Network (MAN), Wide Area Network (WAN) and the Internet.

Figure 2:
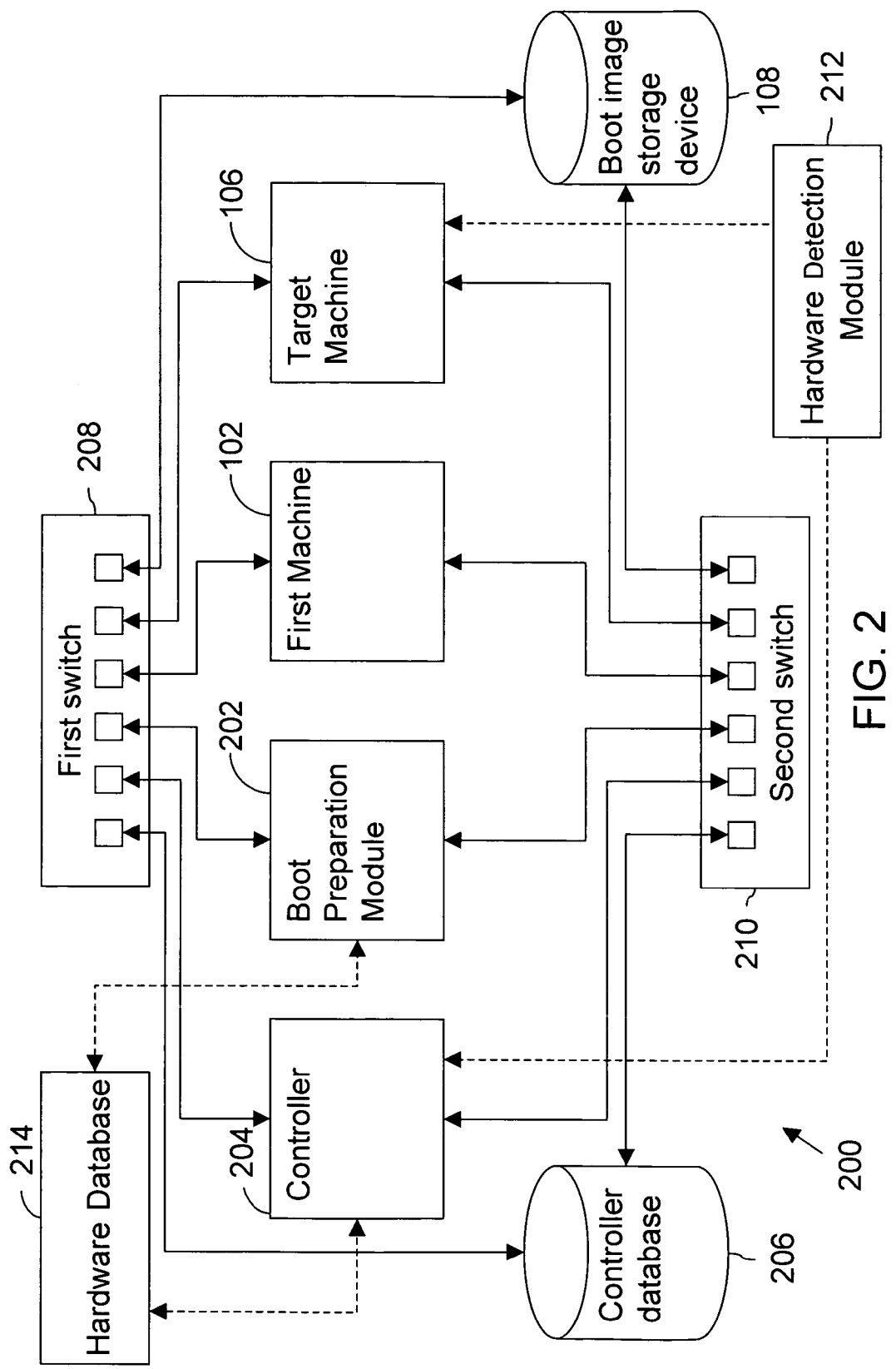
FIG. 2 is a block diagram of a system 200 for automatic generation of an operating system boot image, in accordance with an embodiment of the present invention.

FIG. 2 is a block diagram of a system 200 for automatic generation of an operating system boot image, in accordance with an embodiment of the present invention. System 200 includes first machine 102, target machine 106, a boot preparation module 202, a controller 204, a controller database 206, boot image storage device 108, a first switch 208, a second switch 210, a hardware detection module 212, and a hardware database 214.

First machine 102, target machine 106, boot preparation module 202, controller 204, controller database 206, and boot image storage device 108 are connected in network 100. In an embodiment of the present invention, first machine 102, target machine 106, boot preparation module 202, controller 204, controller database 206, and boot image storage device 108 are connected through one or more network devices such as first switch 208 and second switch 210. Each network device has a channel associated with it. The channel may be a logical connection of the machine with the network. For example, target machine 106 is associated with a first channel and a second channel corresponding to first switch 208 and second switch 210, respectively. Therefore, each machine may be associated with one or more channels in the network. Further, each machine in the network has a unique machine identifier associated with it. Boot image storage device 108 includes an operating system boot image, which is installed on first machine 102. In an embodiment of the present invention, the operating system boot image may be Microsoft® Windows® 2000, Microsoft® Windows® XP and Microsoft® Windows® 2003.

Controller 204 collects the hardware information of all the machines on network 100 and uses the hardware information to determine if boot preparation is required. Examples of the hardware information include, but are not limited to, Peripheral Component Interconnect (PCI) device instance ID, a Peripheral Component Interconnect (PCI) device Identifier, a Media Access Control (MAC) address, and one or more channels associated with all PCI devices present on a machine. If boot preparation is required, controller 204 sends the hardware information to boot preparation module 202. Boot preparation module 202 modifies the file system, such as the New Technology File System (NTFS) of the operating system boot image. Further, boot preparation module 202 modifies the registry hive of the operating system boot image.

In addition, controller 204 extracts the hardware information of target machine 106 present in the network. In an embodiment of the present invention, the hardware information is extracted by remotely booting the hardware detection module 212 on target machine 106. Hardware detection module 212, such as a hardware detection image, identifies the hardware information of all devices present on target machine 106 and sends them to controller 204. The devices may include PCI devices present on target machine 106. The identification of the hardware information is performed when hardware detection module 212 is booted on target machine 106.

The hardware information of each machine is stored in the form of a hardware list in controller database 206. The hardware information is stored based on the unique machine identifier of each machine. For example, controller database 206 includes the hardware information of previous target machine 104 and target machine 106, based on their unique machine identifier. Further, controller 204 extracts the image configuration information of each boot image, such as the operating system boot image present on network 100. The image configuration information includes a list of PCI Instance IDs of each configured instance of a software device driver available on the operating system boot image. The image configuration information is stored in controller database 206, based on a unique operating system identifier of the operating system boot image.

Additionally, controller 204 identifies the requirement of boot preparation, based on the hardware information of previous target machine 104 and target machine 106. Further, the requirement of boot preparation is also based on the image-configuration information of each boot image. If boot preparation is required, controller 204 sends the hardware information to boot preparation module 202. Boot preparation module 202 includes hardware database 214 that includes a list of PCI device IDs, corresponding registry entries, and corresponding driver files. Boot preparation module 202 configures the operating system boot image, based on the hardware information, the image-configuration information, and the hardware database. For example, image configuration includes modifying the file system and the registry hive of the operating system boot image.

In an embodiment of the invention, boot preparation module 202 and controller 204 are present on the same machine. Examples of the machine may include a computer, a server, and the like. In another embodiment of the invention, boot preparation module 202 is present on first machine 102. In various embodiments of the present invention, controller database may be present in controller 204 or any other machine in the network. In an embodiment of the present invention, boot image storage device 108 is connected to boot preparation module 202.

In various embodiments of the invention, different elements of system 200, such as boot preparation module 202, controller 204, controller database 206, boot image storage device 108, first switch 208, second switch 210, hardware detection module 212, and hardware database 214, may be implemented in the form of hardware, software, firmware or combinations thereof.

Figure 3:
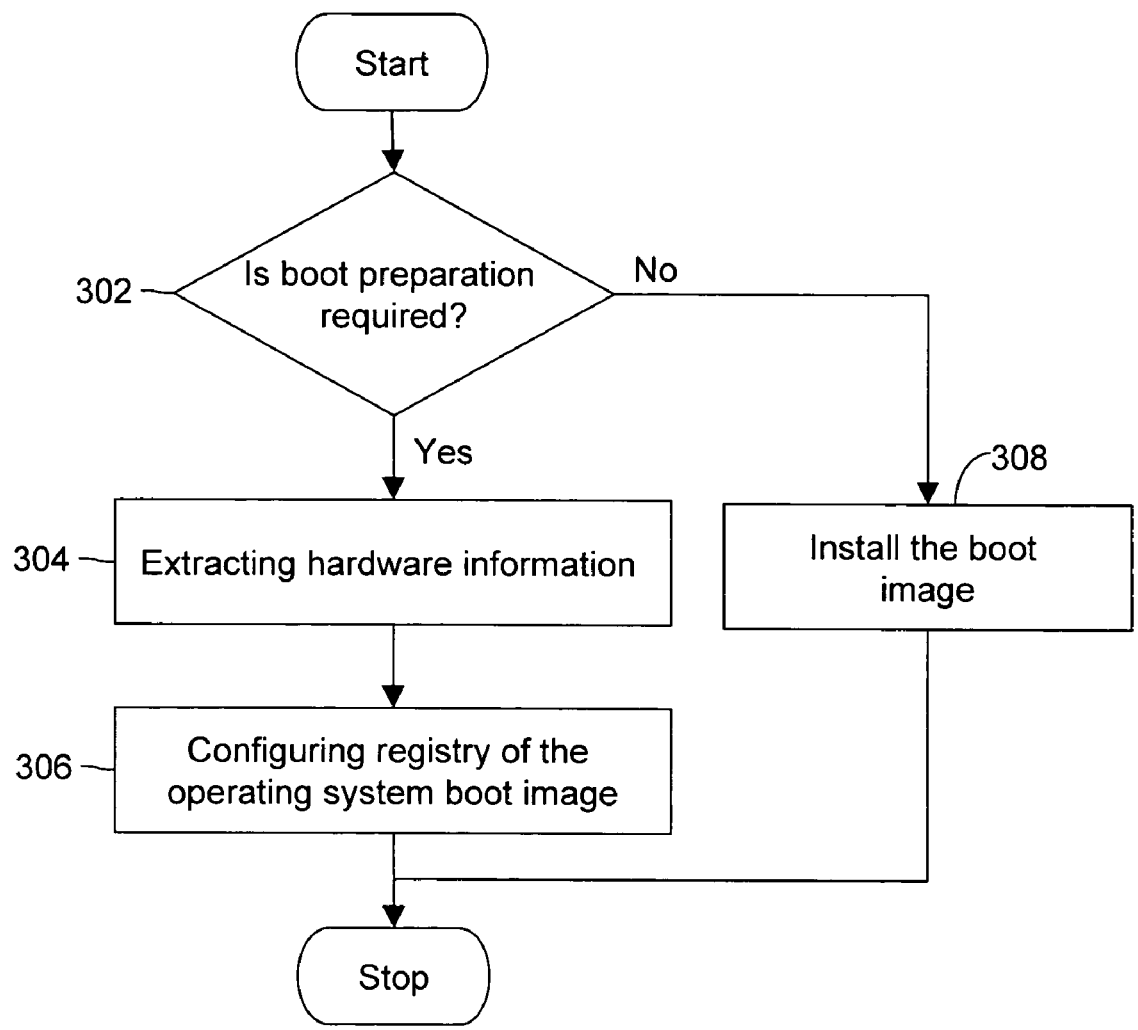
FIG. 3 is a flowchart of a method for automatic generation of an operating system boot image, in accordance with an embodiment of the present invention.

FIG. 3 is a flowchart of a method for automatic generation of an operating system boot image, in accordance with an embodiment of the present invention. At step 302, it is determined if boot preparation is required. Boot preparation includes preparing an operating system boot image to successfully boot on target machine 106. The steps involved in the determination of boot preparation are explained in detail in conjunction with FIG. 4. If boot preparation is required, the hardware information of target machine 106 is extracted at step 304. In an embodiment of the present invention, the hardware information includes a list of one or more Peripheral Component Interconnect (PCI) Instance IDs present on target machine 106. The extraction of the hardware information is explained in detail in conjunction with FIG. 5. In an embodiment of the present invention, if one or more operating system boot images are present in the network, image configurations of each of the one or more operating system boot images are extracted. Thereafter, an operating system boot image is allocated for target machine 106, based on the image configurations and the hardware information.

At step 306, the operating system boot image is configured, based on the hardware information. For example, the operating system boot image is configured by modifying the existing registry entries in the registry hive with the corresponding entries of the one or more PCI Instance IDs present on target machine 106.

However, at step 302, if boot preparation is not required, i.e. if configuration of the operating system boot image is in accordance with the hardware information of target machine 106, the boot image is installed on target machine 106 without any change in configuration, at step 308.

Figure 4:
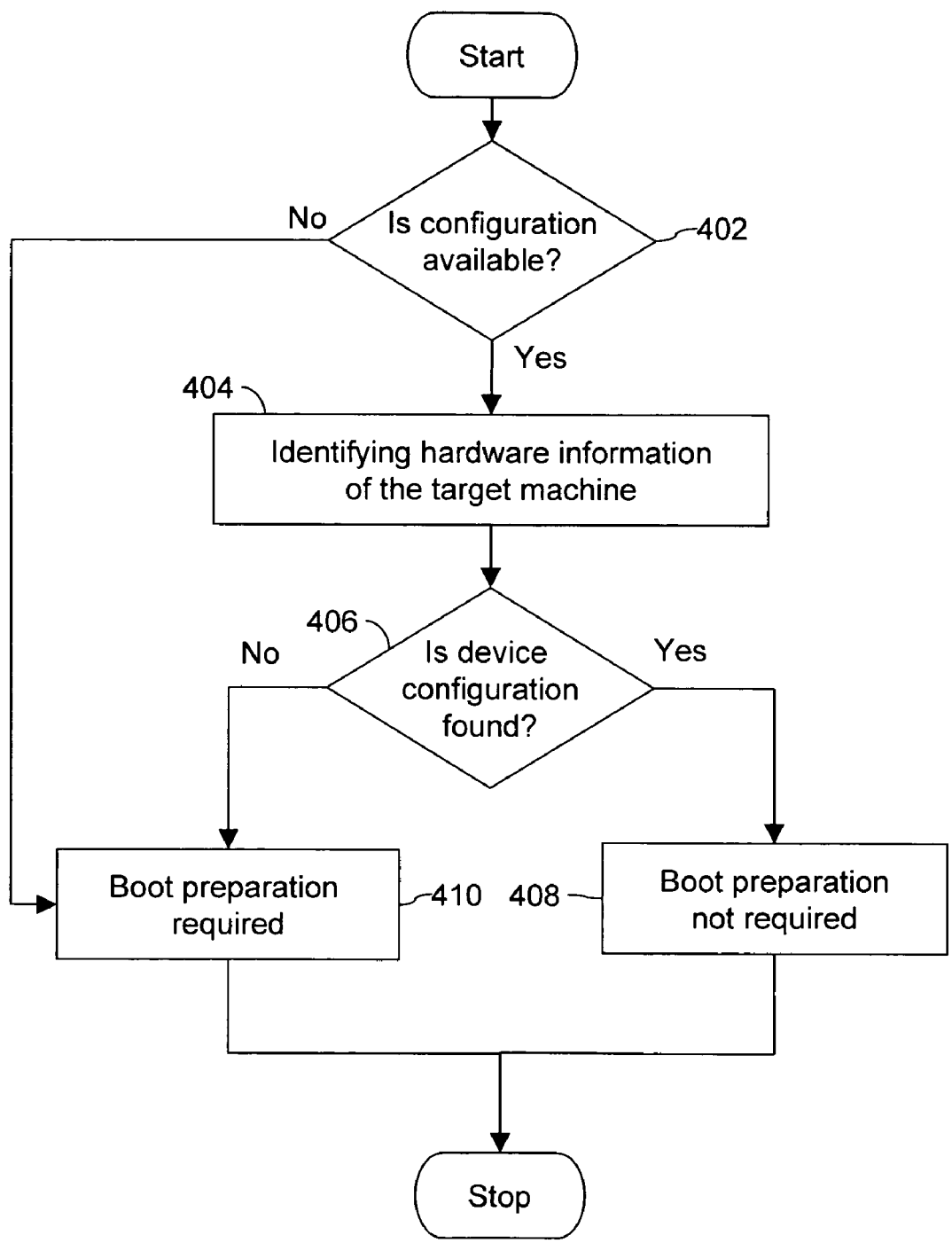
FIG. 4 is a flowchart of a method for determining boot preparation, in accordance with an embodiment of the present invention.

FIG. 4 is a flowchart of a method for determining boot preparation, in accordance with an embodiment of the present invention. At step 402, it is determined if the image-configuration information pertaining to the operating system boot image is available, based on the unique operating system identifier. In an embodiment of the present invention, controller 204 searches controller database 206 to determine the availability of the image-configuration information. If the image configuration is available, hardware information relating to target machine 106 is identified from the hardware list, based on the unique identification number, at step 404.

At step 406, it is determined whether a configured software device driver is available in the image configuration information for each PCI device Instance ID present in the hardware list. If a configured software device driver is available for each PCI device Instance ID, it is determined that boot preparation is not required at step 408. However, if a configured software device driver is not available for at least one of the PCI device Instance IDs present in the hardware list, it is determined that boot preparation is required at step 410.

At step 402, if image configuration is not available, step 410 is performed. At step 410, it is determined that boot preparation is required.

Figure 5:
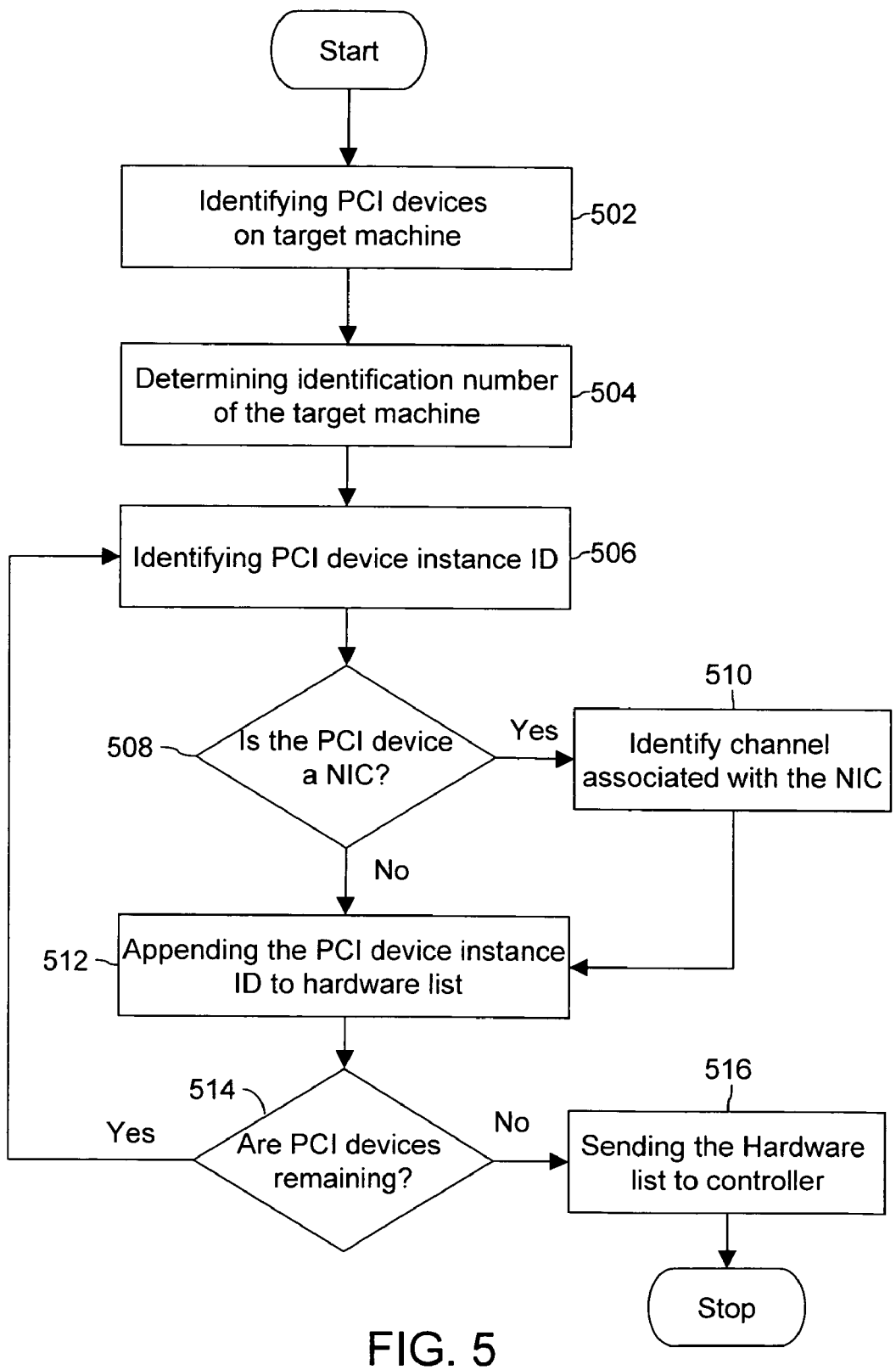
FIG. 5 is a flowchart of a method for extracting the hardware information, in accordance with an embodiment of the present invention.

FIG. 5 is a flowchart of a method for extracting the hardware information, in accordance with an embodiment of the present invention. At step 502, one or more PCI devices are identified on target machine 106. In an embodiment of the present invention, the one or more PCI devices are identified by installing a hardware-detection image on target machine 106. At step 504, a unique machine identifier of target machine 106 is determined. In an embodiment of the present invention, the unique machine identifier is determined from the System Management Basic Input/Output System (SMBIOS) of the target machine. At step 506, the PCI device Instance ID, is identified for each PCI device present on target machine 106. Thereafter, at step 508, it is checked whether the PCI device is a Network Interface Card (NIC). If the PCI device is a NIC, the Media Access Control (MAC) address and one or more channels associated with the NIC are identified at step 510 by sending a query to all the network devices attached to target machine 106. The identification of the MAC address and the channels is explained in detail in conjunction with FIG. 6. Each PCI device has a PCI device identifier associated with it. The PCI device instance ID, the PCI device identifier, the MAC address and the channels are appended in a hardware list at step 512. In an embodiment of the present invention, the hardware list is stored in controller database 206. If the PCI device is not a NIC, the PCI device instance ID and the PCI device identifier are appended to the hardware list at step 512. The hardware list is identified by the unique machine identifier of target machine 106.

At step 514, it is determined whether the steps 502 to 512 have been performed for each PCI device present in target machine 106. If one or more PCI devices remain, a PCI device Instance ID is identified for another PCI device at step 506. Thereafter, the steps mentioned above are performed for each PCI device present on target machine 106. However, if each PCI device has been performed, the hardware list is sent to controller 204 at step 516.

Figure 6:
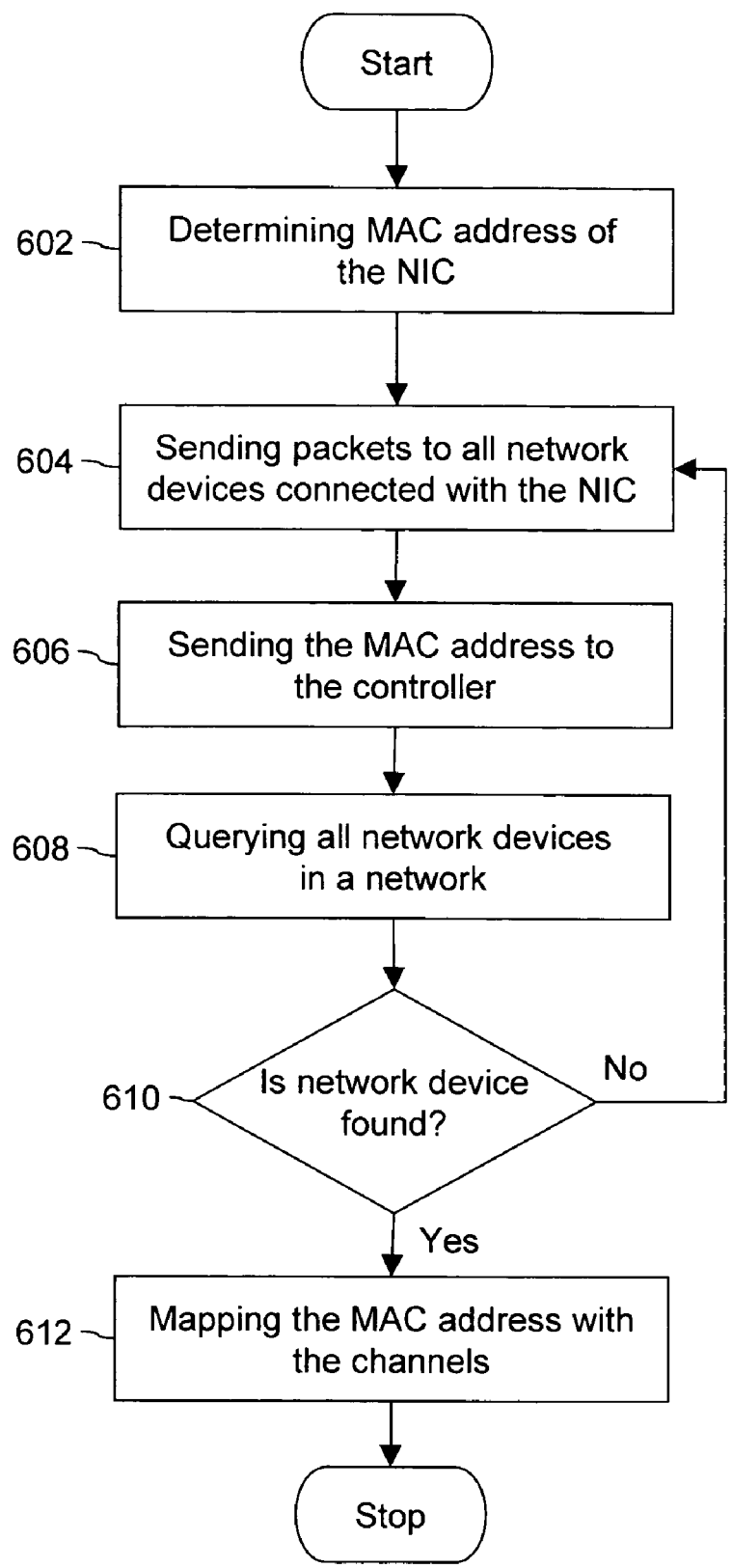
FIG. 6 is a flowchart of a method for identifying the channel associated with the NIC, in accordance with various embodiments of the present invention; and FIG. 7a, FIG. 7b, FIG. 7c.
Figure 7A:
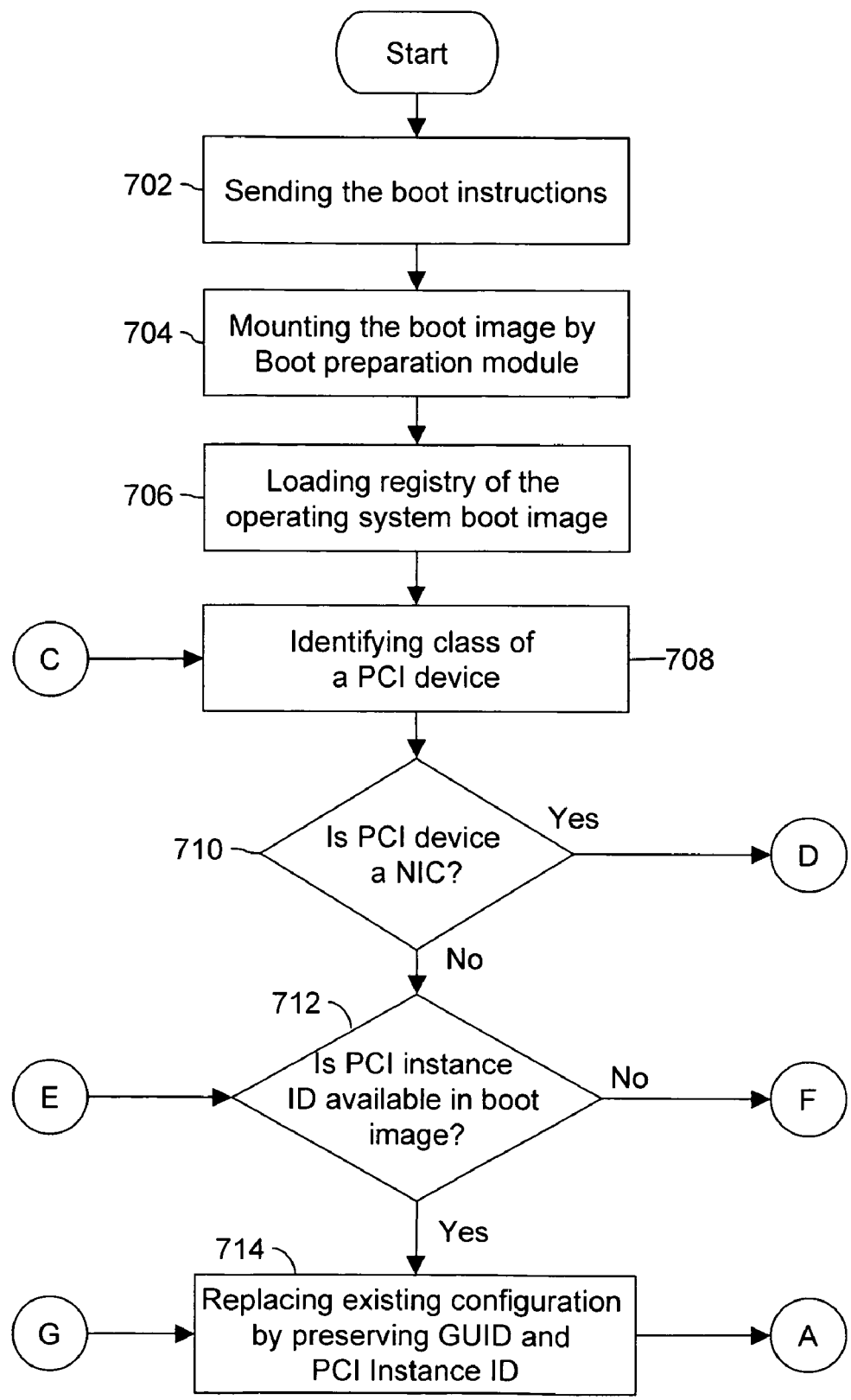
FIG. 7d is a flowchart of a method for automatic generation of an operating system boot image, in accordance with an embodiment of the present invention.
Figure 7B:
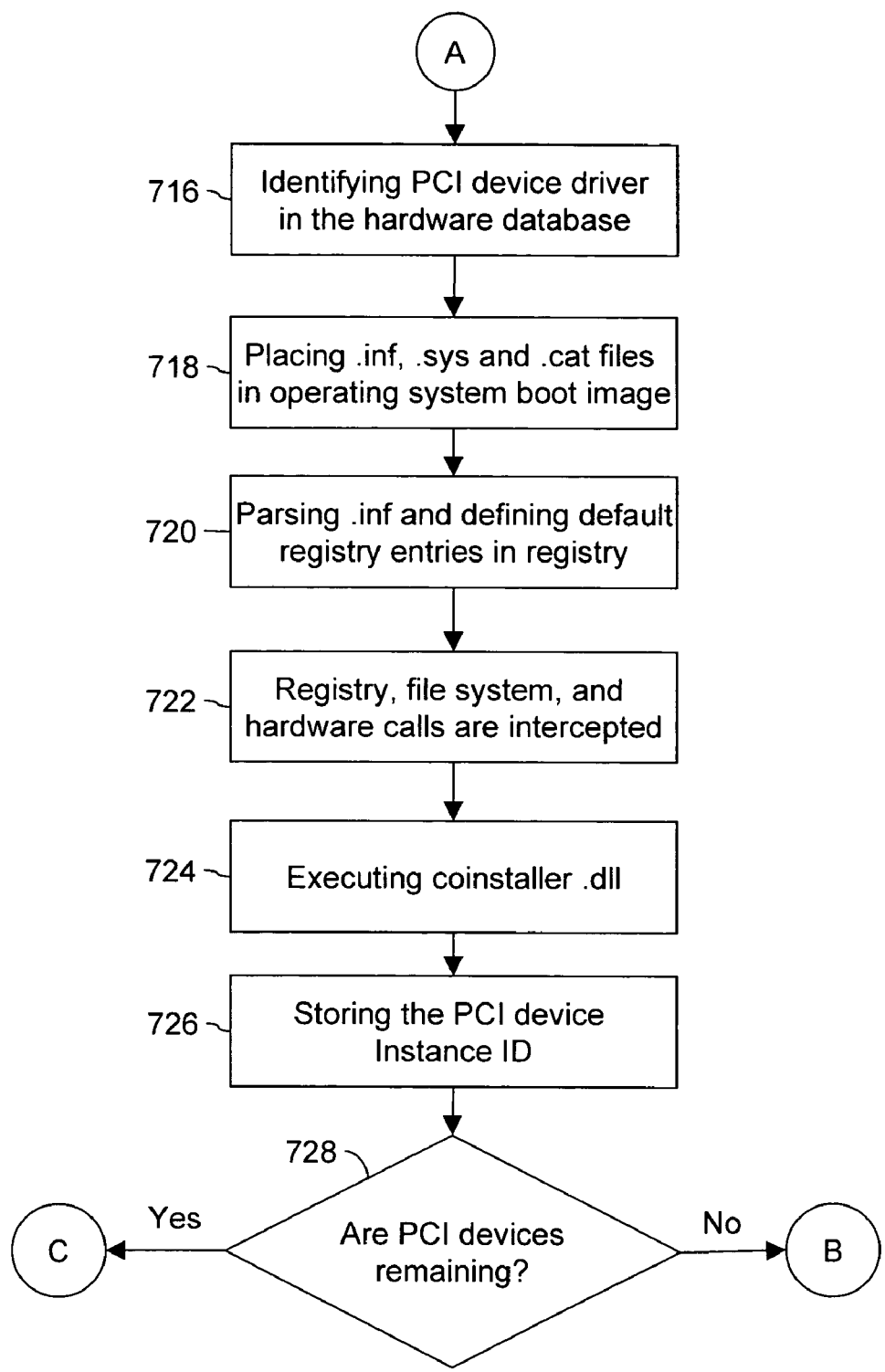
Figure 7C:
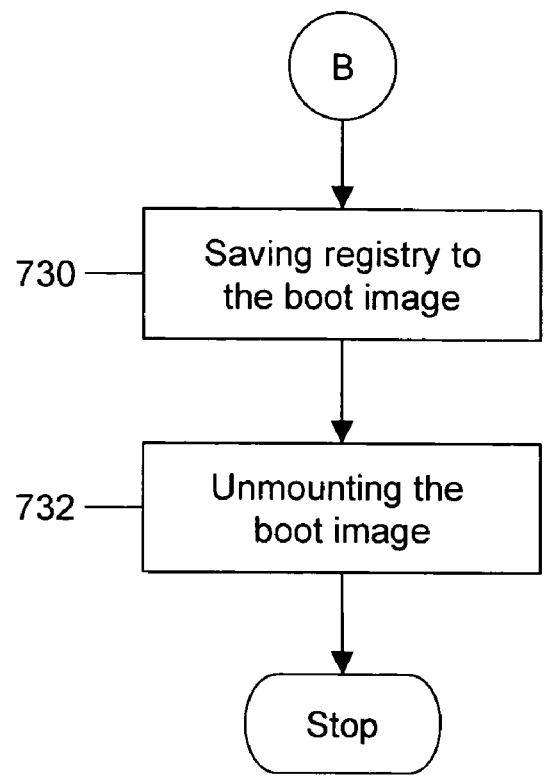
Figure 7D:
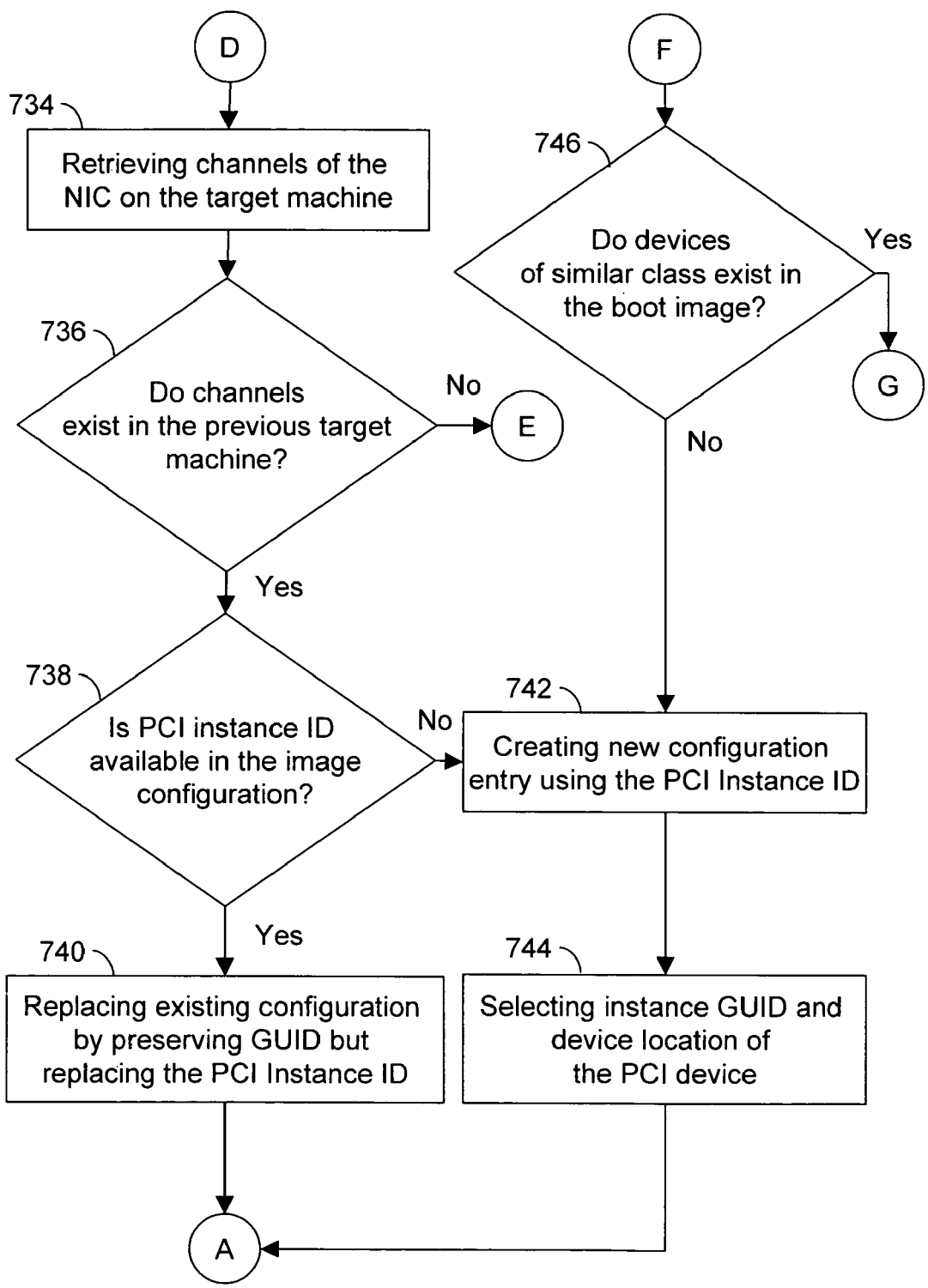

FIG. 6 is a flowchart of a method for identifying the channel associated with the NIC, in accordance with various embodiments of the present invention. The Media Access Control (MAC) address associated with the NIC is identified at step 602. The MAC address is the globally unique hardware address of the NIC. At step 604, the NIC broadcasts data packets in the network, which are received by the network devices connected with the NIC. At step 606, the MAC address is sent to the controller. In an embodiment of the present invention, the MAC address may be sent by boot preparation module 202. As network devices that receive the data packets determine and store the MAC address of the sender, a query is sent to each network device in the network at step 608, to identify the network devices that are connected with the NIC. The one or more network devices connected with the NIC, and visible via Data Link Layer of the network, are identified as various channels associated with the NIC. At step 610, it is determined whether the query has identified a network device that stores the MAC address. If the network device is identified, a mapping is developed between the MAC address and one or more channels associated with the NIC at step 612. However, if the network device is not identified, steps 604, 606, and 608 are performed until the network device has been identified.

FIG. 7_a_, FIG. 7_b_, FIG. 7_c_ and FIG. 7_d_ is a flowchart of a method for the automatic generation of an operating system boot image, in accordance with an embodiment of the present invention. At step 702, controller 204 sends the boot instructions to boot preparation module 202. In various embodiments of the present invention, the boot instructions include the location of the operating system boot image, and the hardware list corresponding to previous target machine 104 and target machine 106. At step 704, boot preparation module 202 mounts the operating system boot image, based on the boot instructions. At step 706, the registry hive of the operating system boot image is loaded in the memory of boot preparation module 202. In an embodiment of the present invention, the registry hive, such as HKEY_LOCAL_MACHINE, is loaded in the memory.

At step 708, the class of a PCI device that is selected from the hardware list of target machine 106 is identified. Examples of the class include a NIC, a storage adapter and a video adapter. In the Windows® operating systems, each device type is categorized into a class, and each class is identified by a GUID. For example, a NIC is categorized into a Globally Unique Identifier (GUID) such as {4D36E972-E325-11CE-BFC1-08002bE10318}. At step 710, it is determined whether the PCI device is a NIC based on the NIC device configuration in the registry. In the Windows® operating systems, the NIC device configurations are stored in the registry at HKEY_LOCAL_MACHINE\SYSTEM\CurrentControlSet\Control\Class\{4D36E972-E325-11CE-BFC1-08002bE10318}. If the PCI device is not a NIC, it is determined at step 712 if a PCI device instance ID corresponding to the PCI device is present in the image configuration of the operating system boot image. If the PCI device instance ID is present in the image configuration, the existing configuration corresponding to the PCI device in the registry hive of the operating system boot image is updated with the hardware configuration of target machine 106 at step 714. However, the existing instance GUID, such as NetCfgInstanceId and the PCI device instance ID in the registry hive, remains unchanged.

At step 716, the device driver of the PCI device is identified from the hardware database. Thereafter, at step 718, installation of the device driver is simulated by placing the .inf, .sys, and .cat files from the device driver in the operating system boot image. At step 720, the .inf file is parsed and the default registry entries corresponding to the PCI device are identified from the file. The default registry entries are updated in the registry hive of the operating system boot image.

At step 722, a simulation environment is created on boot preparation module 202 by intercepting the registry calls, file system calls and hardware calls of the operating system boot image. During this interception, the calls are modified to change their pointer location from the registry of boot preparation module 202 to the registry of the operating system boot image. Additionally, the calls to various hardware devices may also be intercepted. The simulation environment facilitates simulation of the operating system boot image that is loaded on target machine 106. The simulation enables configuration of the registry and file system of the operating system boot image according to target machine 106. Thereafter, at step 724, a coinstaller .dll, corresponding to the PCI device, is executed within the simulation environment. At step 726, the PCI device instance ID of the PCI device is stored in a database. The database may be present in controller database 206 or boot preparation module 202. Thereafter, at step 728, it is determined whether each PCI device Instance ID in the hardware list of target machine 106 is configured. If one or more PCI device Instance IDs of target machine 106 are not configured, the class of the PCI device that has not been configured is identified at step 708. However, if each PCI device Instance ID has been configured, the registry hive is saved in the operating system boot image at step 730. At step 732, the operating system boot image is unmounted from boot preparation module 202.

At step 710, if the PCI device selected from the hardware list of target machine 106 is a NIC, then one or more channels associated with the NIC are retrieved from the hardware list at step 734. At step 736, it is determined whether the one or more channels are present in the hardware list of previous target machine 104. If the channels are not present, it is determined, at step 712, whether a PCI device instance ID corresponding to the PCI device is present in the image configuration of the operating system boot image. Thereafter, the steps mentioned above are performed for all the PCI devices present in the hardware list of target machine 106. However, at step 736, if the one or more channels are present in the hardware list of previous target machine 104, it is determined, at step 738, whether a PCI device instance ID corresponding to the PCI device is present in the image configuration of the operating system boot image. If the PCI device instance ID corresponding to the PCI device is present, the existing configuration, such as PCI Instance ID corresponding to the PCI device, is updated in the registry hive with the hardware configuration of target machine 106 at step 740. However, the existing instance GUID in the registry hive remains unchanged. Thereafter, the device driver of the PCI device is identified from the hardware database, at step 716. The consecutive steps are performed for all the PCI device Instance IDs in the hardware list of target machine 106.

However, if the PCI device instance ID corresponding to the PCI device is not present at step 738, a new configuration entry corresponding to the PCI device is created in the registry at step 742. Moreover, at step 744, the instance GUID and device location corresponding to the PCI device are selected in the registry. Thereafter, the device driver of the PCI device is identified from the hardware database at step 716. The consecutive steps are performed for each PCI device Instance ID in the hardware list of target machine 106.

If the PCI device instance ID is not present in the operating system boot image at step 712, it is determined, at step 746, whether a PCI device of a similar class is present in the registry of the operating system boot image. If the PCI device of a similar class is present, the existing configuration corresponding to the PCI device in the registry is updated with the hardware configuration of target machine 106 at step 714. However, if the PCI device of a similar class is not present, a configuration entry corresponding to the PCI device is created in the registry at step 742. The consecutive steps are performed for each PCI device Instance ID in the hardware list of target machine 106.

The method and system described above have a number of advantages. The method generates an operating system boot image to remotely boot a target machine without manual intervention. This helps the administrators of servers in a data center to employ remote booting as an effective means for re-purposing the target machine to match their current needs. Further, the method reduces the overhead of storing multiple boot images for different hardware configurations. This eliminates the need for purpose-built target machines and leads to material savings in resources, time and money.

The system for automatic generation of an operating system boot image, as described in the present invention or any of its components, may be embodied in the form of a computer system. Typical examples of a computer system includes a general-purpose computer, a programmed microprocessor, a micro-controller, a peripheral integrated circuit element, and other devices or arrangements of devices that are capable of implementing the steps that constitute the method of the present invention.

The computer system comprises a computer, an input device, a display unit and a means for communication to other computer systems. The computer also comprises a microprocessor. The microprocessor is connected to a communication bus. The computer also includes a memory. The memory may include Random Access Memory (RAM) and Read Only Memory (ROM). The computer system also comprises a storage device. The storage device can be a hard disk drive or a removable storage-drive such as a floppy disk drive, optical disk drive, etc. The storage device can also be other similar means for loading computer programs or other instructions into the computer system. The computer system also includes a communication unit. The communication unit allows the computer to connect to other databases and the Internet through an I/O interface. The communication unit allows the transfer as well as reception of data from other databases. The communication unit may include a modem, an Ethernet card, or any similar device, which enables the computer system to connect to databases and networks such as LAN, MAN, WAN and the Internet. The computer system facilitates inputs from a user through input device, accessible to the system through I/O interface.

The computer system executes a set of instructions that are stored in one or more storage elements, in order to process input data. The storage elements may also hold data or other information as desired. The storage element may be in the form of an information source or a physical memory element present in the processing machine.

The set of instructions may include various commands that instruct the processing machine to perform specific tasks such as the steps that constitute the method of the present invention. The set of instructions may be in the form of a software program. Further, the software may be in the form of a collection of separate programs, a program module with a larger program or a portion of a program module, as in the present invention. The software may also include modular programming in the form of object-oriented programming. The processing of input data by the processing machine may be in response to user commands, results of previous processing or a request made by another processing machine.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for remotely booting a target machine using a first machine, the first machine and the target machine being connected in a network, the method comprising the steps of:
   a. extracting hardware information of all devices present on the target machine;
   b. automatically configuring an operating system boot image based on the extracted hardware information, the operating system boot image being configured on the first machine; and
   c. remotely booting the target machine, the target machine being booted by loading the configured operating system boot image on the target machine.

2. The method according to claim 1 further comprising the step of configuring the registry, wherein the configuring of the registry comprises modifying a registry entry in the operating system boot image using the hardware information associated with a Peripheral Component Interconnect (PCI) device instance ID, wherein the PCI device instance ID is associated with a PCI device present on the target machine.

3. The method according to claim 1 further comprising the step of extracting image configuration of the operating system boot image.

4. The method according to claim 1 further comprising the step of storing the hardware information of the target machine based on a unique machine identifier in a controller database, the controller database being connected to the network.

5. The method according to claim 1, wherein the hardware information comprises at least one of: a Peripheral Component Interconnect (PCI) device instance ID, a Peripheral Component Interconnect (PCI) device Identifier, a Media Access Control (MAC) address, and one or more channels, wherein the PCI device instance ID, the PCI device Identifier, the MAC address, and the one or more channels are associated with a PCI device present on the target machine.

6. The method according to claim 5 further comprising the step of identifying a channel associated with the PCI device instance identifier based on the class of the PCI device.

7. The method according to claim 6, wherein the class comprises at least one of: a Network Interface Card (NIC), a storage adapter and a video adapter.

8. A method for remotely booting a target machine using a first machine, the target machine and the first machine being part of a network, the network comprising boot image storage devices, the boot image storage devices storing one or more operating system boot images, the method comprising the steps of:
   a. extracting image configuration of the one or more operating system boot images;
   b. extracting hardware information of all devices present on the target machine;
   c. allocating an operating system boot image for the target machine based on the image configuration and the hardware information;
   d. creating a simulation environment, the simulation environment facilitates automatic configuration of the operating system boot image, the operating system boot image being configured on the first machine; and
   e. remotely booting the target machine by loading the configured operating system boot image on the target machine.

9. A system for remotely booting a target machine using a first machine, the first machine and the target machine being connected with each other, the system comprising:
   a. a controller, the controller extracting hardware information of all devices present on the target machine;
   b. a boot preparation module, the boot preparation module configuring an operating system boot image, the operating system boot image being configured automatically on the first machine based on the extracted hardware information; and
   c. the first machine, the first machine remotely booting the target machine by loading the configured operating system boot image on the target machine.

10. The system according to claim 9, wherein the controller comprises a controller database, the controller database providing storage facilities to store the hardware information.

11. The system according to claim 9 further comprising a hardware database, the hardware database storing registry information and one or more driver files associated with one or more Peripheral Component Interconnect (PCI) device identifiers.

12. The system according to claim 9, wherein the hardware information comprises at least one of: a Peripheral Component Interconnect (PCI) device instance ID, a Peripheral Component Interconnect (PCI) device Identifier, a Media Access Control (MAC) address, and one or more channels, wherein the PCI device instance ID, the PCI device Identifier, the MAC address, and the one or more channels are associated with a PCI device present on the target machine.

13. The system according to claim 12, wherein the PCI device comprises at least one of: a Network Interface Card (NIC), a storage adapter and a video adapter.

14. The system according to claim 9 further comprising a hardware detection module, the hardware detection module determining the hardware information of one or more Peripheral Component Interconnect (PCI) devices, the one or more PCI devices being present on the target machine, the hardware information being provided to the controller.

15. A computer program product for use with a computer the computer comprising a microprocessor for executing a set of instructions, the computer program product comprising a computer usable medium having a computer readable program code embodied therein for remotely booting a target machine using a first machine, the first machine and the target machine being connected in a network, the computer readable program code comprising:

a. a set of instructions for extracting hardware information of all devices present on the target machine;

b. a set of instructions for automatically configuring an operating system boot image based on the extracted hardware information the operating system image being configured on the first machine; and c. a set of instructions for remotely booting the target machine by loading the configured operating system boot image on the target machine.

\* \* \* \* \*